(12) United States Patent
Katayama

(10) Patent No.: US 8,711,421 B2
(45) Date of Patent: Apr. 29, 2014

(54) IMAGE FORMING APPARATUS DETECTING COLOR PATTERNS AND GENERATING INTERLEAF IMAGES AT PREDETERMINED POSITION

(75) Inventor: Takeshi Katayama, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 104 days.

(21) Appl. No.: 13/306,579

(22) Filed: Nov. 29, 2011

(65) Prior Publication Data

US 2012/0163891 A1 Jun. 28, 2012

(30) Foreign Application Priority Data

Dec. 28, 2010 (JP) ................................ 2010-292242

(51) Int. Cl.
G06K 15/00 (2006.01)
G06F 3/12 (2006.01)
H04N 1/04 (2006.01)

(52) U.S. Cl.
USPC ....... 358/1.18; 358/1.12; 358/1.13; 358/1.15; 358/488

(58) Field of Classification Search
None
See application file for complete search history.

(56) References Cited

U.S. PATENT DOCUMENTS

2007/0268315 A1* 11/2007 Hoshino ...................... 345/642
2007/0285724 A1   12/2007 Saito

FOREIGN PATENT DOCUMENTS

| JP | 2000-255885 A | 9/2000 |
| JP | 2004-294535 A | 10/2004 |
| JP | 2007-28098 A | 2/2007 |
| JP | 2010-111078 A | 5/2010 |

OTHER PUBLICATIONS

Communication Pursuant to Article 94(3) EPC issued on Feb. 27, 2014 in corresponding European Patent Application No. 11191303.4.

* cited by examiner

Primary Examiner — Benny Q Tieu
Assistant Examiner — Haris Sabah
(74) Attorney, Agent, or Firm — Birch, Stewart, Kolasch & Birch, LLP.

(57) ABSTRACT

An image forming apparatus or an image output system includes a main image forming section for imposing a plurality of jobs and thereby generating at least one piece of main image data, and an interleaf image forming section for generating an interleaf image depending on the jobs of the main image data and generating interleaf image data including the interleaf image.

20 Claims, 12 Drawing Sheets

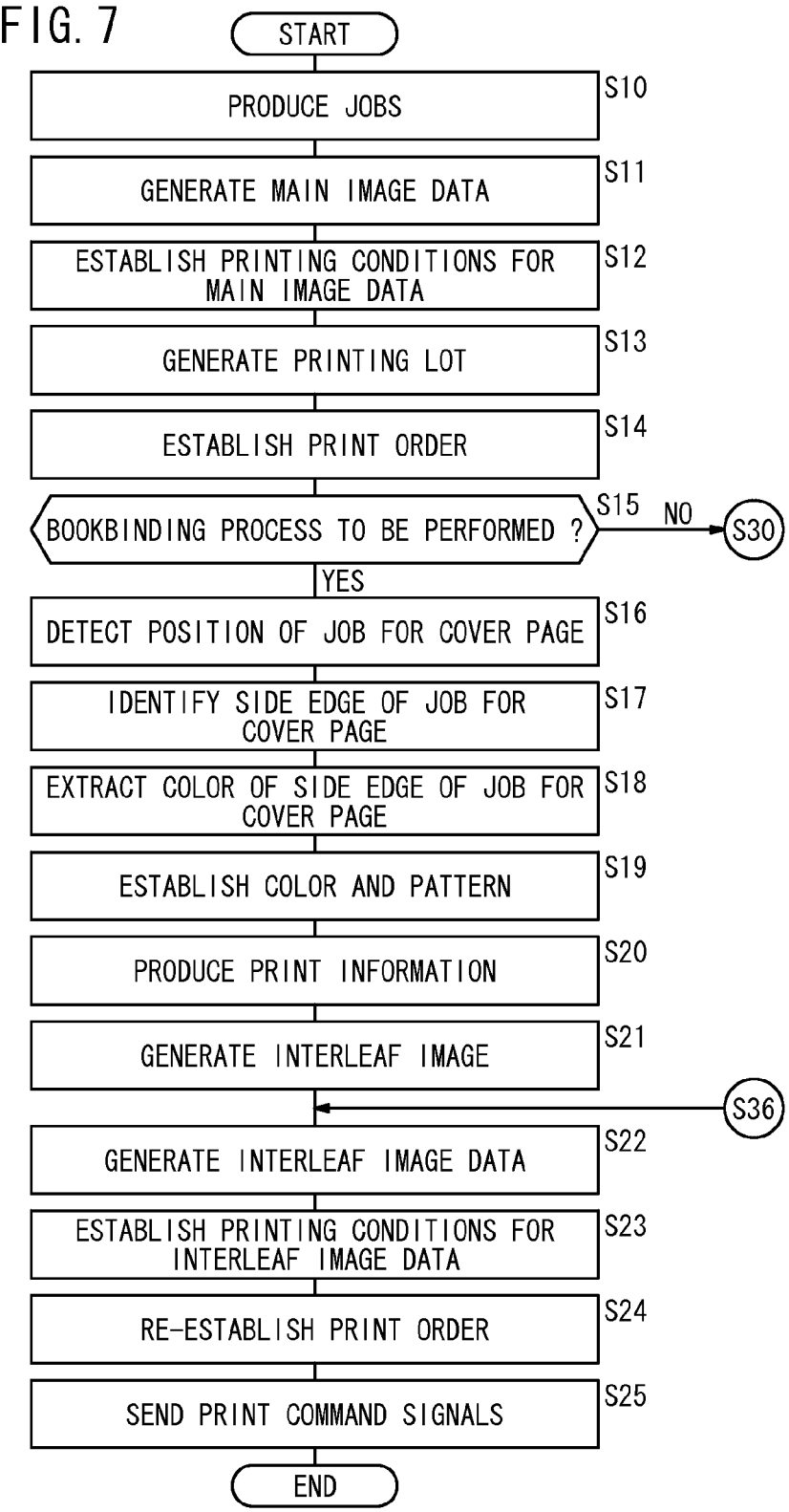

FIG. 8

| | MAIN IMAGE PRINT DATA | | | | |
|---|---|---|---|---|---|
| | NUMBER OF MAIN IMAGE DATA | SUBSEQUENT PROCESS | BOTH-SIDE PRINTING | NUMBER OF SINGLE-SIDE JOBS | NUMBER OF PRINTS |
| PRINT LOT 1 | 2 | BOOKBINDING | ○ | 4 | 500 |
| | INTERLEAF IMAGE PRINT DATA | | | | |
| | INTERLEAF OUTPUT COMMAND | INTERLEAF IMAGE DATA | SUBSEQUENT PROCESS | ...... | NUMBER OF PRINTS |
| PRINT LOT 1-α | ○ | | BOOKBINDING | ...... | 1 |
| | MAIN IMAGE PRINT DATA | | | | |
| | NUMBER OF MAIN IMAGE DATA | SUBSEQUENT PROCESS | BOTH-SIDE PRINTING | NUMBER OF SINGLE-SIDE JOBS | NUMBER OF PRINTS |
| PRINT LOT 2 | 2 | BOOKBINDING | ○ | 4 | 400 |
| | INTERLEAF IMAGE PRINT DATA | | | | |
| | INTERLEAF OUTPUT COMMAND | INTERLEAF IMAGE DATA | SUBSEQUENT PROCESS | ...... | NUMBER OF PRINTS |
| PRINT LOT 2-α | ○ | | BOOKBINDING | ...... | 1 |
| ... | | | | | |
| | MAIN IMAGE PRINT DATA | | | | |
| | NUMBER OF MAIN IMAGE DATA | SUBSEQUENT PROCESS | BOTH-SIDE PRINTING | NUMBER OF SINGLE-SIDE JOBS | NUMBER OF PRINTS |
| PRINT LOT n | 2 | BOOKBINDING | ○ | 4 | 100 |

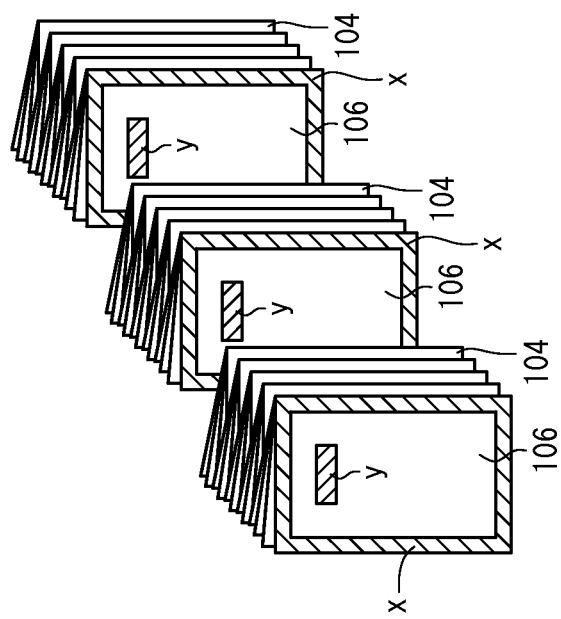
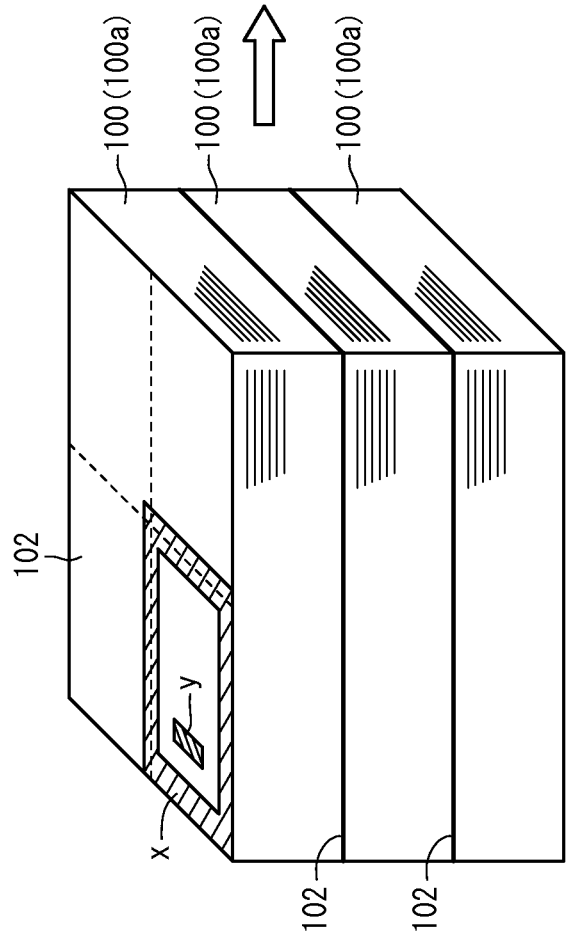

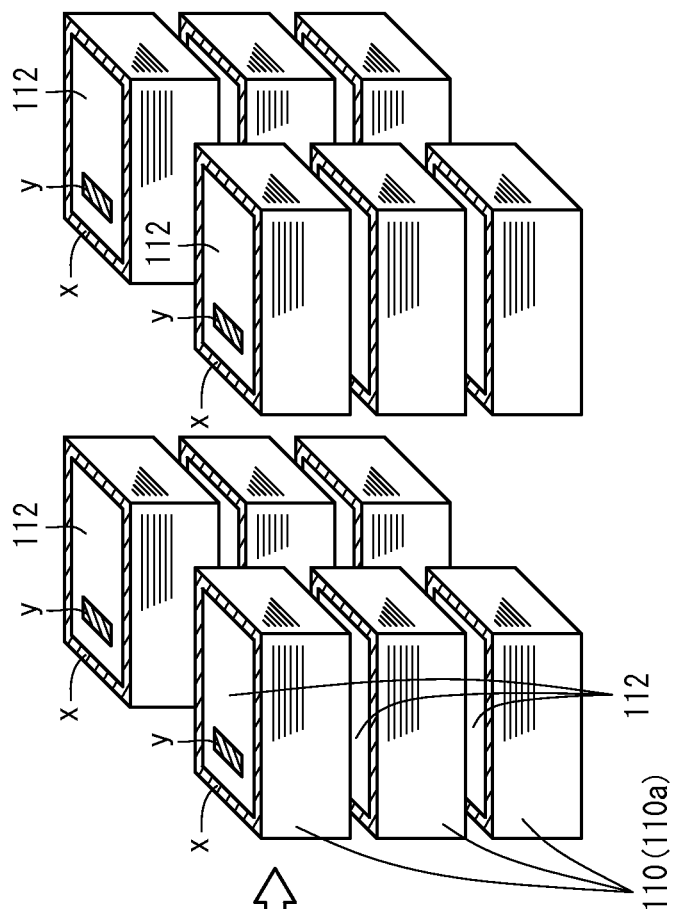
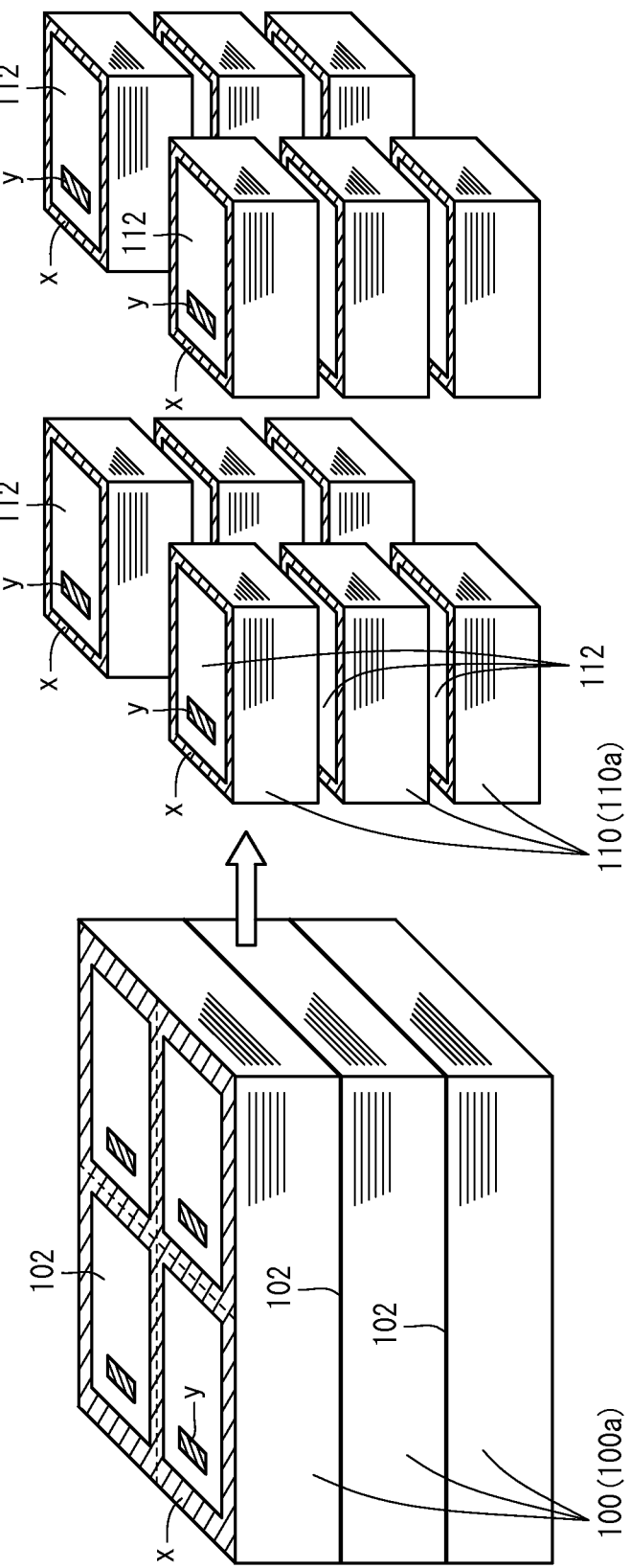
FIG. 11A
FIG. 11B

FIG. 12A

| JOB | NUMBER OF PRINTS | SIZE |
|---|---|---|
| JOB 1 | 400 | A4 |
| JOB 2 | 500 | A4 |
| JOB 3 | 470 | A4 |
| JOB 4 | 450 | A4 |
| ... | ... | ... |
| JOB n | 100 | A5 |

FIG. 12B

| | MAIN IMAGE PRINT DATA | | | | | | | | | |
|---|---|---|---|---|---|---|---|---|---|---|
| | NUMBER OF MAIN IMAGE DATA | SUBSEQUENT PROCESS | BOTH-SIDE PRINTING | NUMBER OF SINGLE-SIDE JOBS | JOB 1 NUMBER OF PRINTS | JOB 2 NUMBER OF PRINTS | JOB 3 NUMBER OF PRINTS | JOB 4 NUMBER OF PRINTS | ... | NUMBER OF PRINTS |
| PRINT LOT 1 | 1 | CUTTING | × | 4 | 400 | 500 | 470 | 450 | ... | 500 |
| | INTERLEAF IMAGE PRINT DATA | | | | | | | | | |
| | INTERLEAF OUTPUT COMMAND | INTERLEAF IMAGE DATA | SUBSEQUENT PROCESS | | | | | | | NUMBER OF PRINTS |
| PRINT LOT 1-α | ○ | ○ | CUTTING | | | | | | ... | 1 |
| | MAIN IMAGE PRINT DATA | | | | | | | | | |
| | NUMBER OF MAIN IMAGE DATA | SUBSEQUENT PROCESS | BOTH-SIDE PRINTING | NUMBER OF SINGLE-SIDE JOBS | JOB 1 NUMBER OF PRINTS | JOB 2 NUMBER OF PRINTS | JOB 3 NUMBER OF PRINTS | JOB 4 NUMBER OF PRINTS | ... | NUMBER OF PRINTS |
| PRINT LOT n | 2 | CUTTING | ○ | 4 | 100 | 90 | 100 | 120 | ... | 120 |

IMAGE FORMING APPARATUS DETECTING COLOR PATTERNS AND GENERATING INTERLEAF IMAGES AT PREDETERMINED POSITION

CROSS-REFERENCE TO RELATED APPLICATION

This application is based upon and claims the benefit of priority from Japanese Patent Application No. 2010-292242 filed on Dec. 28, 2010, of which the contents are incorporated herein by reference.

BACKGROUND OF THE INVENTION

1. Field of the Invention

The present invention relates to an image forming apparatus and an image forming method for generating an interleaf image for separating printed sheets in a case where an edited job is printed as images on print sheets, an image output system for printing an interleaf image on a print sheet, and a program for generating an interleaf image and outputting the generated interleaf image to a print sheet.

2. Description of the Related Art

In recent years, the widespread use of DTP (DeskTop Publishing) and CTP (Computer To Plate) technologies or the progress of printing machines has allowed image output systems to operate according to a digital printing process work flow as a whole thereby to produce a small number of prints on a POD (Print On Demand) basis, for example. Such an image output system can carry out an efficient printing process by setting print sheets (print mediums) of the same type of paper in a printing machine and successively printing a plurality of print lots on the print sheets.

In a case where a plurality of print lots are successively printed on print sheets to produce stacked prints, it is occasionally unable to easily distinguish between a stack of prints from a previously printed print lot and a stack of prints from a subsequently printed print lot. Image output systems designed to solve such a problem make it possible to easily distinguish between stacks of prints from two different print lots by inserting an interleaf between those stacks of prints in a case where the stacks of prints from the two different print lots are stacked together (see, for example, Japanese Laid-Open Patent Publication No. 2007-028098 and Japanese Laid-Open Patent Publication No. 2010-111078). Specifically, since the stacked prints with the interleaf inserted therebetween have different colors on their side edges from the color of the side edge of the interleaf, if the stacks of prints are seen in side elevation, it is possible to easily distinguish the stacks of prints from each other based on the inserted position of the interleaf.

SUMMARY OF THE INVENTION

According to an image forming apparatus disclosed in Japanese Laid-Open Patent Publication No. 2007-028098, information formed by an image forming section is printed on an interleaf which is supplied from an interleaf supply unit and whose color is different from the color of print sheets, and the printed interleaf is inserted in a given position between recording sheets or prints that are supplied from a recording sheet supply unit. However, the disclosed image forming apparatus is large in size because the interleaf supply unit is required in addition to the recording sheet supply unit.

According to an ink jet printing apparatus disclosed in Japanese Laid-Open Patent Publication No. 2010-111078, in a case where a certain number of print sheets to be separated as a print lot have been printed, a next print sheet is printed with a mark on an end portion (a side edge) thereof, and used as an interleaf. Since the disclosed ink jet printing apparatus does not need to have an interleaf supply unit, the disclosed ink jet printing apparatus may be smaller in size than the image forming apparatus disclosed in Japanese Laid-Open Patent Publication No. 2007-028098.

In a bookmaking process, image data are generated by imposing a plurality of jobs, and images (hereinafter referred to as main images) based on the image data are printed on print sheets, thereby producing printed pages. Usually, the printed pages are subsequently bound and cut to size into books. If print information is printed on an interleaf as disclosed in Japanese Laid-Open Patent Publication No. 2007-028098 or a side edge of an interleaf is printed with a mark as disclosed in Japanese Laid-Open Patent Publication No. 2010-111078 in a case where the interleaf is inserted between stacks of printed pages with a plurality of jobs printed thereon, then the printed print information or mark may be concealed from view in a subsequent bookbinding process, making it difficult to separate the stacks of printed pages based on the inserted interleaf.

In a case where the printed pages are subsequently cut to shape, the cut edges of the printed pages, i.e., the side edges of the printed pages which are not printed with the mark are exposed, tending to make it difficult to separate the stacks of printed pages, or the printed print information on the interleaf is also cut together with the printed pages, and may not be accurately presented for view.

It is an object of the present invention to provide an image forming apparatus, an image forming method, an image output system, and a program which are capable of reliably separating prints with images (main images) based on a plurality jobs printed thereon, by means of an interleaf which is printed with interleaf images corresponding to the jobs even in a case where the prints are subsequently processed.

To achieve the above object, there is provided in accordance with the present invention an image forming apparatus comprising a main image forming section for imposing a plurality of jobs and thereby generating at least one piece of main image data, and an interleaf image forming section for generating an interleaf image depending on the jobs of the main image data and generating interleaf image data including the interleaf image.

As described above, since the interleaf image forming section generates interleaf image data depending on the jobs of the main image data, it is possible to print interleaves having an interleaf image corresponding to the jobs. Even if a subsequent process such as a bookbinding process or a cutting process is performed on prints, an image based on interleaf image data, i.e., interleaves printed with an interleaf image, make it possible to reliably separate print stacks after they have been processed by the subsequent process. As a result, the prints can easily be separated, and hence the efficiency of an overall process of producing prints is increased.

The interleaf image forming section should preferably form an image representing a color or pattern different from those of the jobs, in an area of the interleaf image data which corresponds to positions of side edges of the jobs of the main image data.

As described above, an image representing a color or pattern different from those of the jobs is formed in an area of the interleaf image data which corresponds to side edges of the jobs. Therefore, even if a subsequent process such as a bookbinding process or a cutting process is performed on interleaves, since the side edges of the interleaves have a different color or pattern from those of the jobs, it is possible to easily separate print stacks after they have been processed by the subsequent process.

The interleaf image forming section should preferably comprise a data reader for reading two pieces of main image data to be printed before and after printing of an image based on the interleaf image data, based on a print order in which the main image data and the interleaf image data are printed, a job state extractor for extracting a color or pattern of the side edges of the jobs of the two pieces of main image data, and an image generator for generating the interleaf image based on the color or pattern extracted by the job state extractor.

With the above structure, a color or pattern of the side edges of the jobs of the two pieces of main image data to be printed before and after printing of an image based on the interleaf image data is extracted. Thus, interleaves printed with an image based on the interleaf image data make it possible to separate print stacks anterior to and posterior to the interleaves more clearly.

The image forming apparatus should preferably further comprise a subsequent process determiner for determining a subsequent process for a print which is printed with an image based on the main image data, wherein the interleaf image forming section should preferably generate the interleaf image data based on information about the subsequent process determined by the subsequent process determiner.

As the interleaf image data are generated based on information about the subsequent process determined by the subsequent process determiner, it is possible to more reliably separate print stacks after they have been processed by a subsequent process.

In a case where the subsequent process determined by the subsequent process determiner includes a process of folding the print, the interleaf image forming section may identify the positions of the jobs produced on a cover page or back cover page of the folded print, and form an image representing a color or pattern different from those of the identified jobs, in an area of the interleaf image data which corresponds to positions of side edges of the identified jobs.

Since an image representing a color or pattern different from those of the identified jobs is formed in an area of the interleaf image data which corresponds to positions of side edges of the identified jobs produced on a cover page or back cover page, even if prints that have been processed by the subsequent process are stacked such that the cover page or back cover page faces upwardly in the subsequent process, interleaves printed with an image based on the interleaf image data make it possible to separate print stacks with ease.

In a case where the subsequent process determined by the subsequent process determiner includes a process of cutting the print, the interleaf image forming section may identify the positions of side edges of the jobs divided by the process of cutting the print, and form an image representing a color or pattern different from those of the identified jobs, in an area of the interleaf image data which corresponds to positions of side edges of the identified jobs.

As described above, an image representing a color or pattern different from those of the identified jobs is formed in an area of the interleaf image data which corresponds to positions of side edges of the identified jobs divided by the process of cutting the print. Thus, even if the jobs are divided by the subsequent process, interleaves printed with an image based on the interleaf image data make it possible to separate print stacks with ease.

The interleaf image forming section may form print information including at least the number of prints, in a given area of the interleaf image data at a position corresponding to the jobs of the main image data.

The print information formed in a given area of the interleaf image data allows a user to know information about the jobs, in addition to the function as interleaves.

According to the present invention, there is also provided an image forming method comprising the first step of, with a main image forming section, imposing a plurality of jobs and thereby generating at least one piece of image data, and the second step of, with an interleaf image forming section, generating an interleaf image depending on the jobs of the main image data and generating interleaf image data including the interleaf image.

According to the present invention, there is also provided an image output system comprising a main image forming section for imposing a plurality of jobs and thereby generating at least one piece of main image data, an interleaf image forming section for generating an interleaf image depending on the jobs of the main image data and generating interleaf image data including the interleaf image, and a print controller for managing the number of prints of an image based on the main image data and a print order in which images based on the main image data and the interleaf image data are printed, as print information for use in a case where the images based on the main image data and the interleaf image data are printed on the same type of print mediums.

As described above, since interleaves corresponding to the jobs are printed, even if a subsequent process such as a bookbinding process or a cutting process is performed on prints, interleaves printed with an image based on interleaf image data make it possible to separate print stacks reliably after they have been processed by the subsequent process. As the print controller manages the main image data and the interleaf image data, an image based on the interleaf image data can be printed at a desired timing while an image is being printed based on the main image data. Thus, prints printed with the image based on the main image data can easily be separated at desired positions. As a result, the prints can be separated more easily, and the efficiency of an overall process of producing prints is increased.

Preferably, the print controller should automatically establish a print order for printing a predetermined number of prints of the image based on the main image data and thereafter printing the image based on the interleaf image data.

The print controller may manage the number of prints for each of the jobs of the main image data, and the main image forming section may automatically generate the main image data by collecting jobs whose numbers of prints are close to each other from among the jobs.

Inasmuch as the number of prints for each of the jobs is managed, and jobs whose numbers of prints are close to each other are collected from among all the jobs, thereby to generate main image data, in a case where images based on the main image data are printed, it is not necessary to perform wasteful printing for each job, and prints can be produced at a reduced cost.

The print controller may detect a job that has the greatest number of prints among the jobs of the main image data, and establish the number of prints of the main image data.

Since main image data are printed based on a job that has the greatest number of prints, all the jobs which make up main image data are reliably printed according to one-time print instruction, and hence the printing process can be performed efficiently.

According to the present invention, there is further provided a program for enabling a computer to function as a main image forming section for imposing a plurality of jobs and thereby generating at least one piece of main image data, and an interleaf image forming section for generating an interleaf image depending on the jobs of the main image data and generating interleaf image data including the interleaf image.

The program may also enable the computer to function as a print controller for managing the number of prints of an image based on the main image data and a print order in which images based on the main image data and the interleaf image data are printed, as print information for use in a case where the images based on the main image data and the interleaf image data are printed on the same type of print mediums.

According to the present invention, in a case where an image made up of a plurality of jobs is printed, even if a subsequent process is performed on prints, interleaves printed with an interleaf image corresponding to the jobs make it possible to separate prints reliably. As a result, the prints can easily be separated, and hence the efficiency of an overall process of producing prints is increased.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a flowchart of an operation sequence of the image output system shown in FIG. 1 for generating interleaf image data in a case where a bookbinding process is subsequently carried out;

FIG. 8 is a diagram showing an example of a print management file that is managed by a print controller of the image output system shown in FIG. 1;

FIG. 9A is a perspective view of stacked prints generated according to the operation sequence shown in FIG. 7;

FIG. 9B is a perspective view of bound brochures containing the prints shown in FIG. 9A;

FIG. 11A is a perspective view of stacked prints generated according to the operation sequence shown in FIG. 10;

FIG. 11B is a perspective view of prints formed by cutting the prints shown in FIG. 11A; and FIGS. 12A and 12B are diagrams showing other examples of print management files that are managed by the print controller of the image output system shown in FIG. 1.

DESCRIPTION OF THE PREFERRED EMBODIMENTS

An image forming apparatus, an image forming method, an image output system, and a program according to a preferred embodiment of the present invention will be described in detail below with reference to the accompanying drawings.

Figure 1:
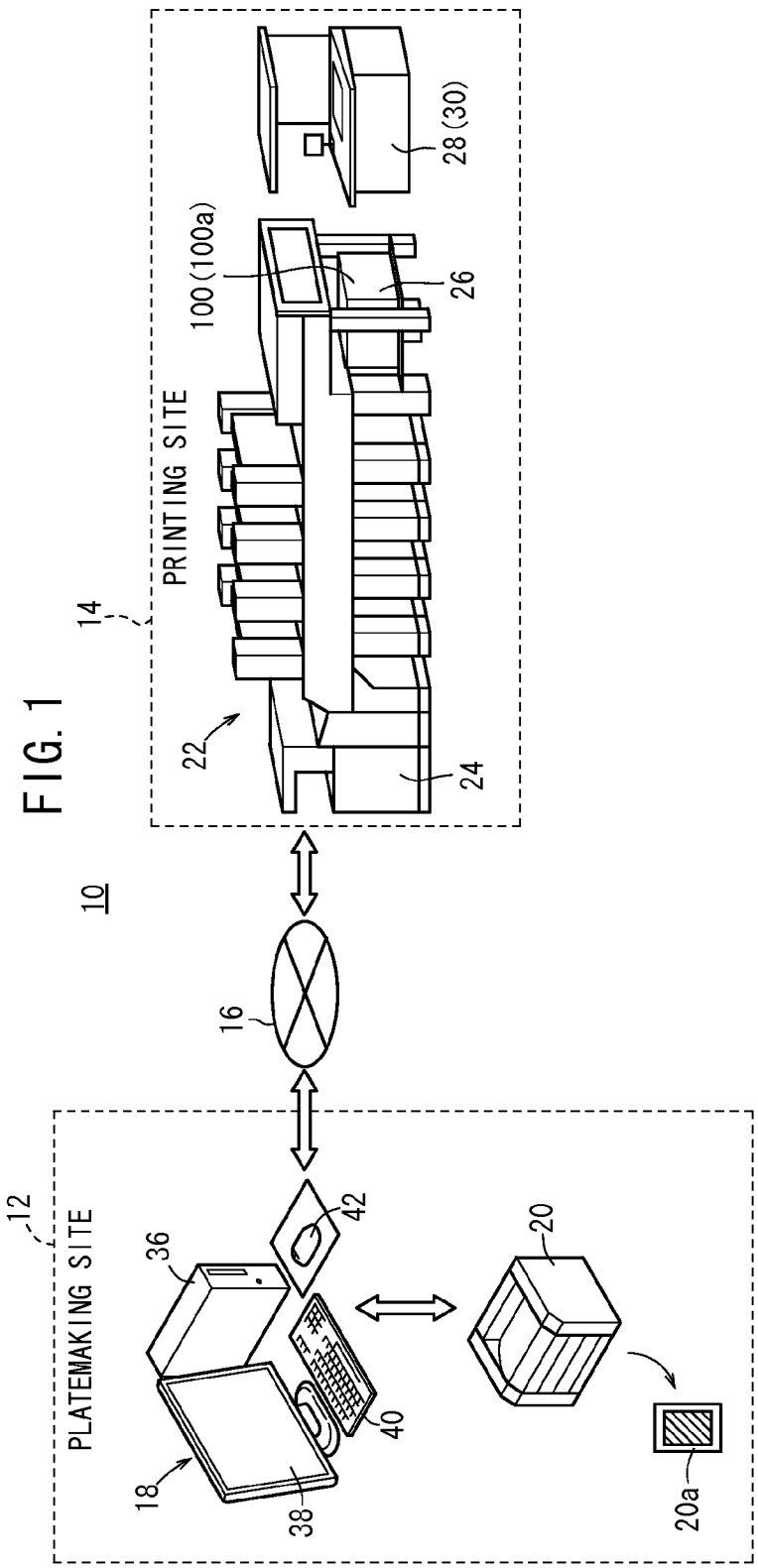
FIG. 1 is a schematic view showing an overall configuration of an image output system according to an embodiment of the present invention.

As shown in FIG. 1, an image output system 10 generally includes a platemaking site 12 for editing image data, which include main image data and interleaf image data, and producing a press plate based on the edited image data, a printing site 14 for outputting prints, and a network 16 interconnecting the platemaking site 12 and the printing site 14. The image output system 10 is configured such that the platemaking site 12 instructs the printing site 14 via the network 16 to produce prints 100.

The platemaking site 12 includes an image forming apparatus 18 and a proofreader 20. The image forming apparatus 18 is an apparatus for editing images such as of texts, graphics, patterns, photos, or the like for each job, and may be in the form of a computer. The image forming apparatus 18 is operated by a user to edit a printing job expressed in a page description language (PDL) according to a job editing application.

The term "job" used herein refers to collective data of images corresponding to a one-page area. For example, if a job is edited on the image forming apparatus 18, then the job represents data for platemaking or data being edited for one page where images such as of texts, graphics, etc. are generated and laid out. If an image is read from a digital camera and directly printed or an image is scanned by a scanner and directly printed, the image may be referred to as a job. The term "page description language" refers to a language which is descriptive of image information including documentary information, positional information, color information (including density information), etc. of texts, graphics, etc. in a page that serves as an output unit for printing, displaying, or the like. Known types of the PDL include PDF (Portable Document Format according to ISO32000-1: 2008), PostScript (registered trademark) of AdobeSystems, and XPS (XML Paper Specification).

The image forming apparatus 18 according to the present embodiment has a function to send print commands to the printing site 14 and the proofreader 20. In a case where the image forming apparatus 18 sends print commands to the printing site 14 and the proofreader 20, the image forming apparatus 18 performs an image processing sequence, e.g., a color conversion process, a layout process, etc., on data for platemaking or data being edited, to convert the data into raster-format image data, e.g., bitmap data or TIFF data. The image forming apparatus 18 then converts the raster-format image data into a signal suitable for printing processes performed by the printing site 14 and the proofreader 20, adds printing conditions representative of the number of print copies to be produced, etc. to the signal, and sends the signal with the printing conditions added as a print command signal.

The proofreader 20 is an apparatus for outputting a proof 20a of a job produced by the image forming apparatus 18. The proofreader 20 may comprise a DDCP (Direct Digital Color Proofer) which is equivalent in performance to an offset printing machine, an ink jet color proofer, a color laser printer (electrophotographic printer), an ink jet printer, or the like.

The network 16 is constructed as a LAN or the like, and interconnects the platemaking site 12 and the printing site 14. On the basis that the platemaking site 12 and the printing site 14 will be located in different working fields in the image output system 10, data can be transmitted between the platemaking site 12 and the printing site 14 through the network 16.

The printing site 14 includes a printing machine 22 for outputting, i.e., printing, images based on image data formed by the platemaking site 12. The printing machine 22 may be an offset printing machine, a digital printing machine, or the like. The printing machine 22 performs a printing process on a print sheet or print medium according to a print command signal sent from the image forming apparatus 18.

The printing machine 22 includes a sheet supply section 24 for setting print sheets therein and a sheet discharge section 26 for stacking printed sheets produced by the printing machine 22. In the sheet supply section 24, a large number of print sheets which are of the same paper type may be set, so that the printing machine 22 can successively print a plurality of print lots.

The term "paper type" used herein refers to any of various classifications of sheets including kinds of paper such as uncoated paper (gravure sheets) and coated paper, qualities of paper such as art paper and coated paper, and sizes of paper such as A series and B series. The term "print lot" used herein refers to a unit of prints produced by the printing machine 22. For example, in a case where the printing machine 22 produces a given number of prints, e.g., 100 prints, based on a single print command sent from the image forming apparatus 18, the produced prints are referred to as one print lot. In a case where the printing machine 22 is instructed to print a succession of pages by a single print command sent from the image forming apparatus 18, the printed pages are also referred to as one print lot. Therefore, in a case where the printing machine 22 is instructed to successively produce a plurality of print lots by the image forming apparatus 18, a stack of prints 100 in the order of the print lots are produced in the sheet discharge section 26.

Figure 2:
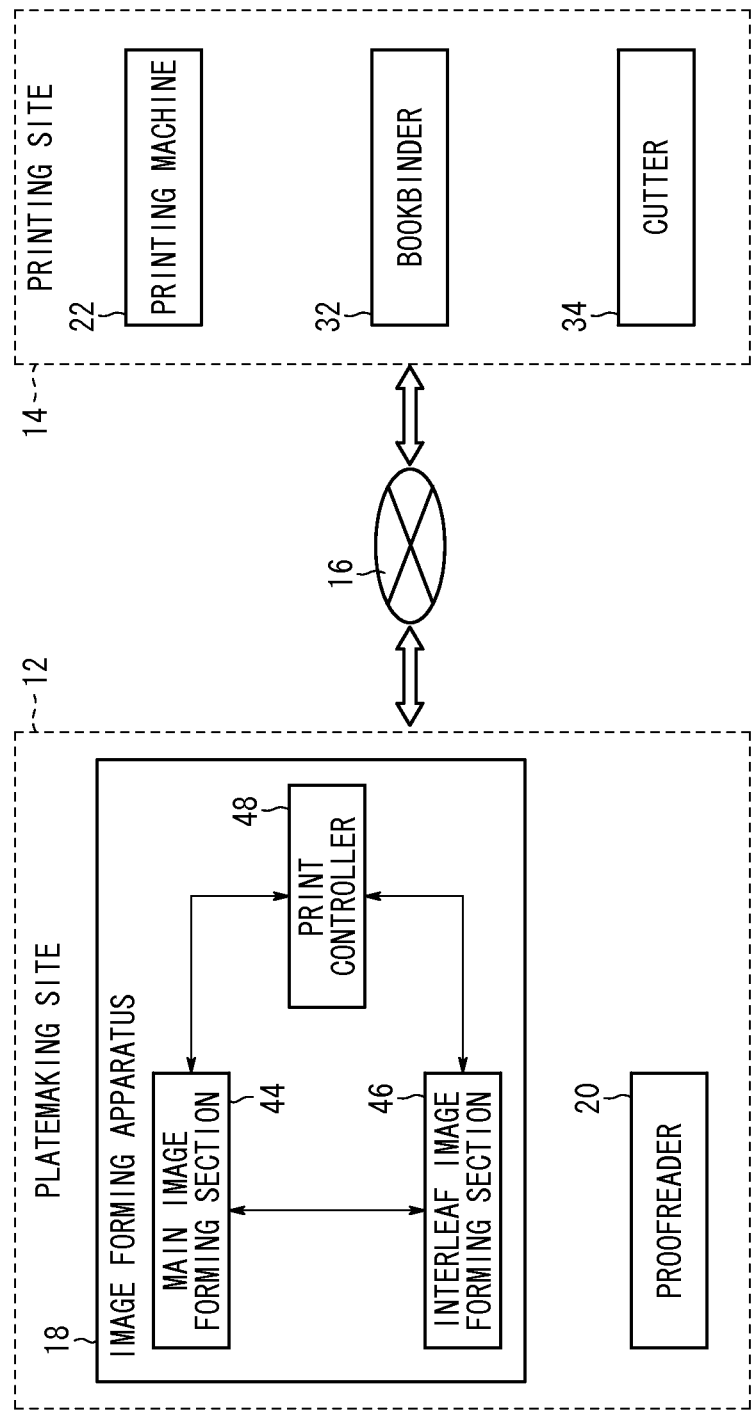
FIG. 2 is a functional block diagram of the image output system shown in FIG. 1.

The printing site 14 also includes an image processor 28 for processing image data sent from the image forming apparatus 18 and a platesetter 30 for producing press plates. As shown in FIG. 2, the printing site 14 further includes a bookbinder 32 or a cutter 34 for performing a subsequent process on prints 100 produced by the printing machine 22. The bookbinder 32 folds the prints 100 at a give position or cuts off portions of the prints 100 that have been folded thereby to produce brochures or folded pamphlets as final products. The cutter 34 cuts the prints 100 into prints that are smaller in size than the original print sheets. The bookbinder 32 or the cutter 34 may be integrally combined with the printing machine 22. If the bookbinder 32 is integrally combined with the printing machine 22, the printing machine 22 also performs a bookbinding process on the prints 100 and outputs bound brochures into the sheet discharge section 26.

Figure 3:
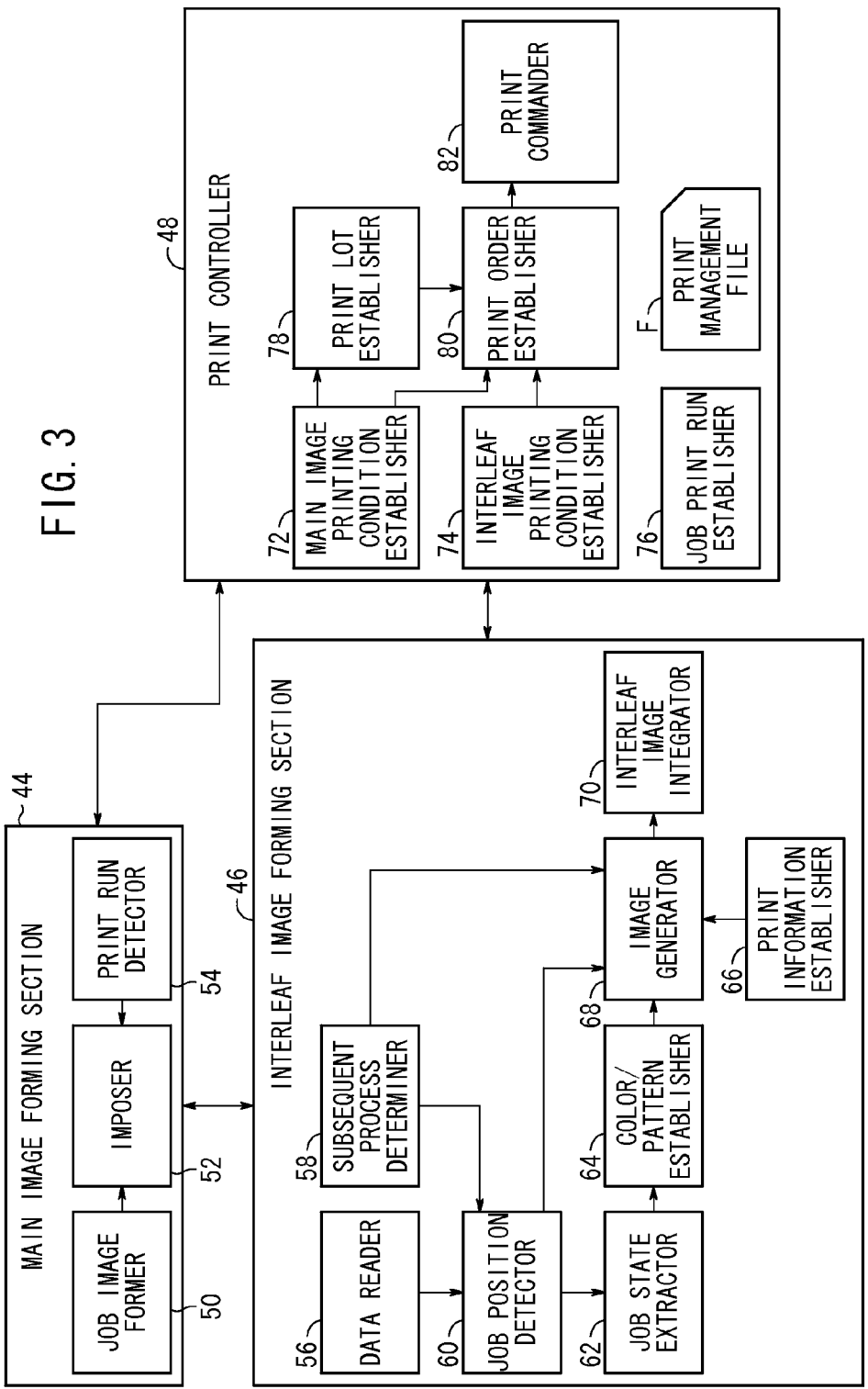
FIG. 3 is a functional block diagram of an image forming apparatus shown in FIG. 2.

FIG. 2 is a functional block diagram of the image output system 10 shown in FIG. 1. FIG. 3 is a functional block diagram of the image forming apparatus 18 shown in FIG. 2. As shown in FIG. 1, the image forming apparatus 18 includes a main unit 36, a display monitor 38, a keyboard 40, and a mouse 42. The display monitor 38, the keyboard 40, and the mouse 42 are connected to the main unit 36. The main unit 36 includes a processor, an input/output unit, and a storage unit, not shown.

As shown in FIG. 2, the image forming apparatus 18 has a main image forming section 44, an interleaf image forming section 46, and a print controller 48 which are implemented by the processor and the storage unit. In other words, the main image forming section 44, the interleaf image forming section 46, and the print controller 48 are provided by programs which are run by a computer, and function to perform given processes according to the programs. The main image forming section 44 generates main image data, which are what the user wants to print. The interleaf image forming section 46 generates interleaf image data for interleaves (see FIGS. 9A, 9B and 11A, 11B) for separating prints 100 printed with images based on the main image data. The print controller 48 manages printing conditions for the main image data and the interleaf image data, and issues printing commands to the printing machine 22.

In the present embodiment, since the platemaking site 12 and the printing site 14 are connected to each other by the network 16, the main image forming section 44, the interleaf image forming section 46, and the print controller 48 are included in the image forming apparatus 18. However, if the platemaking site 12 and the printing site 14 are not connected to each other by the network 16, then the print controller 48 may be included in an operating console (not shown) of the printing machine 22. Alternatively, the image forming apparatus 18 may include only the main image forming section 44, and the printing machine 22 may include the interleaf image forming section 46 and the print controller 48. In this case, main image data produced by the image forming apparatus 18 that is located at a production site may be carried by means of a storage medium such as a CD-ROM or the like, and then read into the printing machine 22 at a printing site. Then, the printing machine 22 may generate interleaf image data therein, and may print images based on the main image data and the interleaf image data.

The image output system 10 according to the present embodiment is arranged to produce prints 100 with a plurality of jobs imposed thereon based on the premise that the prints 100 will subsequently be processed by the bookbinder 32 or the cutter 34. Accordingly, the main image forming section 44 of the image forming apparatus 18 has a function to impose a plurality of jobs to generate main image data, in addition to a function to edit jobs. As shown in FIG. 3, the main image forming section 44 includes a job image former 50 for editing jobs, an imposer 52 for imposing a plurality of jobs, and a print run detector 54 for detecting the number of prints produced for each job.

The job image former 50 produces print jobs from texts and graphics edited by the user. In a case where the user edits a job, the proofreader 20 (see FIG. 1) outputs a proof 20a of the edited job. The user can edit the job efficiently by referring to the proof 20a. The job image former 50 may be arranged to automatically adjust the colors and layout of texts or graphics of the job in order to assist the editing work. The job edited on the job image former 50 is stored in the storage unit of the image forming apparatus 18.

The imposer 52 generates main image data to be printed with a plurality of jobs imposed thereto. For example, in the imposer 52, a plurality of jobs stored in the storage unit are selected by the user, and the selected jobs are applied (pasted) to blank main image data (base data), thereby to generate main image data. Also, for example, the user assigns page numbers to pages, and the imposer 52 may impose jobs automatically according to the order of the pages, or the imposer 52 may impose jobs automatically based on the size of print sheets to be printed and the size of the jobs. The imposer 52 may further be arranged to impose jobs automatically based on the number of prints of the jobs as detected by the print run detector 54. The imposition based on the number of prints of the jobs will be described later.

The print run detector 54, which is connected to the print controller 48, detects the number of prints of each job which has been edited on the job image former 50. The number of prints of each job as detected by the print run detector 54 is sent to the imposer 52 for use in an imposing process based on the number of prints of each job.

The interleaf image forming section 46 of the image forming apparatus 18 generates an interleaf image depending on a job of main image data, and generates interleaf image data including the interleaf image. For an easier understanding of the generation of interleaf image data by the interleaf image forming section 46, main image data and interleaf image data generated by the image forming apparatus 18 will first be described in specific detail below.

Figure 4B:
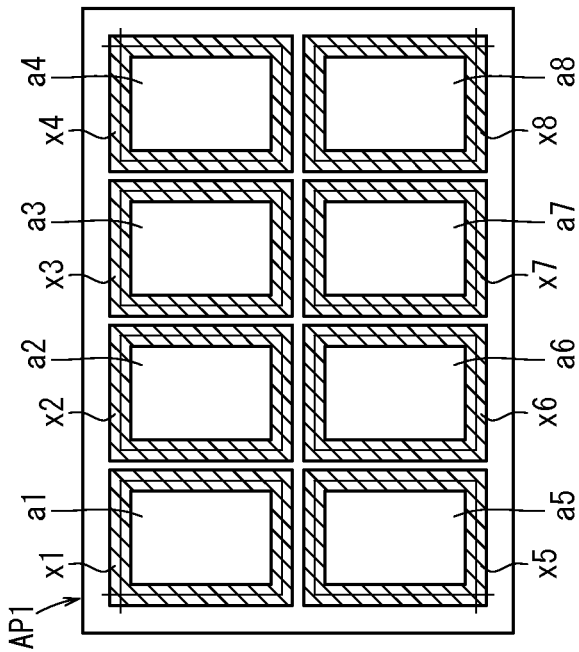
FIG. 4B is a view showing interleaf image data generated by the image output system shown in FIG. 1.
Figure 4A:
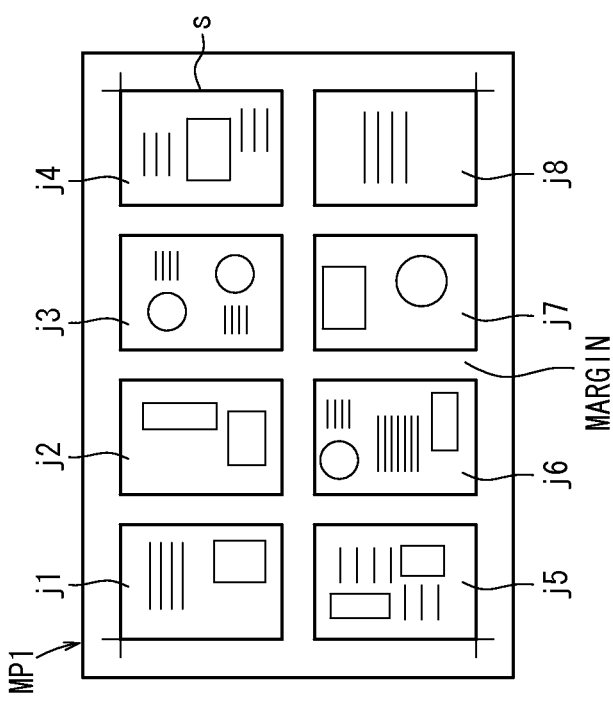
FIG. 4A is a view showing by way of example main image data generated by the image output system shown in FIG. 1.
Figure 5B:
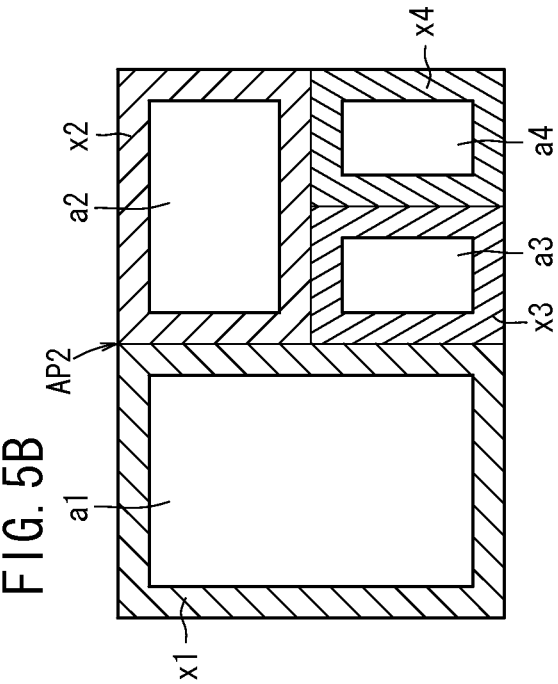
FIG. 5B is a view showing other interleaf image data generated by the image output system shown in FIG. 1.
Figure 5A:
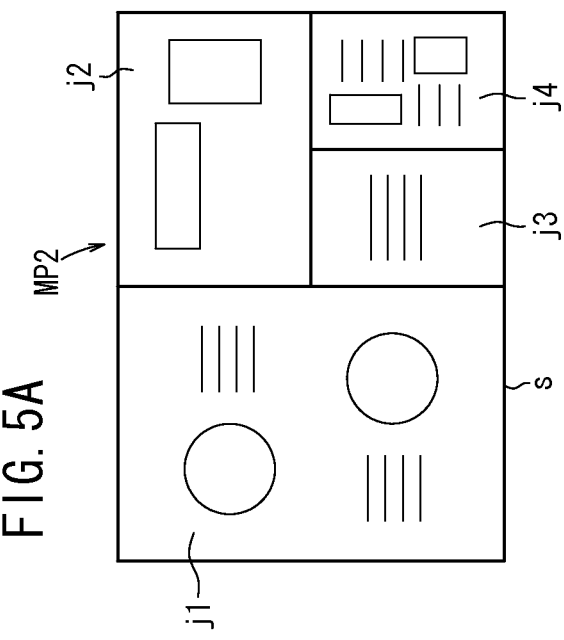
FIG. 5A is a view showing other main image data generated by the image output system shown in FIG. 1.
Figure 6B:
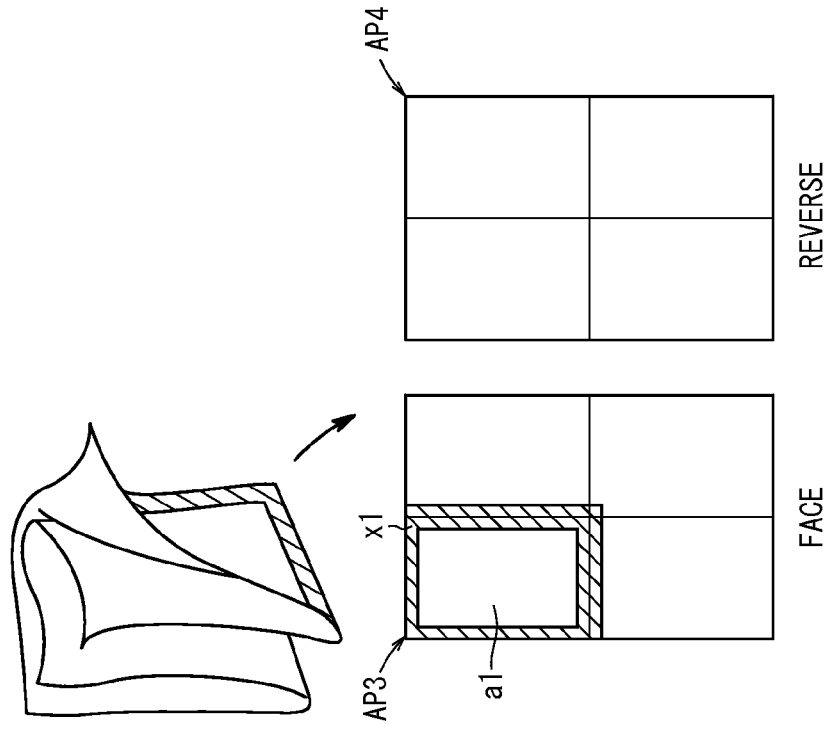
FIG. 6B is a view showing still other interleaf image data generated by the image output system shown in FIG. 1.

FIGS. 4A through 6B are views showing by way of example image data generated by the image output system 10 according to the present embodiment. More specifically, FIGS. 4A, 5A, and 6A show main image data, and FIGS. 4B, 5B, and 6B show interleaf image data.

FIG. 4A shows main image data MP1 to which eight jobs j1 through j8 are imposed. As described above, the jobs j1 through j8 may be selected and arranged on the imposer 52 by the user, or may be automatically arranged based on page numbers assigned thereto by the user. In FIG. 4A, the jobs j1 through j8 are shown as being imposed with margins therebetween. However, the jobs j1 through j8 may be imposed without any margins therebetween.

FIG. 4B shows interleaf image data AP1 generated depending on the eight jobs j1 through j8 of the main image data MP1. The interleaf image data AP1 are generated as follows: First, the main image data MP1 are read and the positions where the jobs j1 through j8 are imposed are detected. The positions of the jobs j1 through j8 of the main image data MP1 are thus detected. Then, hypothetical side edges that match the size of the jobs j1 through j8, i.e., side edges s of the jobs j1 through j8, which have been positionally identified are established, and color/pattern forming areas x1 through x8 (shown hatched in FIG. 4B) are established based on the hypothetical side edges. It is instructed to print a color that serves as an interleaf, on the color/pattern forming areas x1 through x8. If there are margins around the jobs j1 through j8 imposed as shown in FIG. 4A, then the color/pattern forming areas x1 through x8 should preferably be established so as to lie across and over the hypothetical side edges. The color/pattern forming areas x1 through x8 thus established are capable of serving as interleaves because the coloring of the side edges of the interleaves remains even if the interleaves are subsequently cut depending on the jobs j1 through j8.

The interleaf image forming section 46 generates the interleaf image data AP1 as follows: The colors of the side edges s of the jobs j1 through j8 of the main image data MP1 as shown in FIG. 4A are extracted, and it is instructed to print a color which is different from the extracted color of each of the side edges s of the jobs j1 through j8, on the color/pattern forming areas x1 through x8. In this manner, eight interleaf images a1 through a8 (see FIG. 4B) are generated for the respective jobs j1 through j8, and then combined into the interleaf image data AP shown in FIG. 4B. It may be instructed to print a pattern such as a striped pattern or a mesh pattern, rather than a color, on the color/pattern forming areas x1 through x8.

FIG. 5A shows main image data MP2, which are different from the main image data MP1 shown in FIG. 4A, with a plurality of (four) jobs j1 through j4 of different page sizes being imposed thereto. The main image forming section 44 may selectively impose the jobs j1 through j4 of different page sizes to the main image data MP2 as shown in FIG. 5A. For example, if print sheets that are set in the sheet supply section 24 are of size A2, then a job j1 of size A3 (left), a job j2 of size A4 (upper right), and two jobs j3, j4 of size A5 (lower right) are imposed to generate the main image data MP2.

FIG. 5B shows interleaf image data AP2 representing interleaf images a1 through a4 generated depending on the size and positions of the four jobs j1 through j4 of the main image data MP2 shown in FIG. 5A. More specifically, the interleaf image a1 which corresponds to the job j1 of size A3 includes a color/pattern forming area x1 established at a position corresponding to a side edge s of the job j1 of size A3. The interleaf image a2 which corresponds to the job j2 of size A4 includes a color/pattern forming area x2 established at a position corresponding to a side edge s of the job j2 of size A4. The interleaf images a3, a4 which correspond to the jobs j3, j4 of size A5 include color/pattern forming areas x3, x4 established at a position corresponding to side edges s of the jobs j3, j4 of size A5.

Figure 6A:
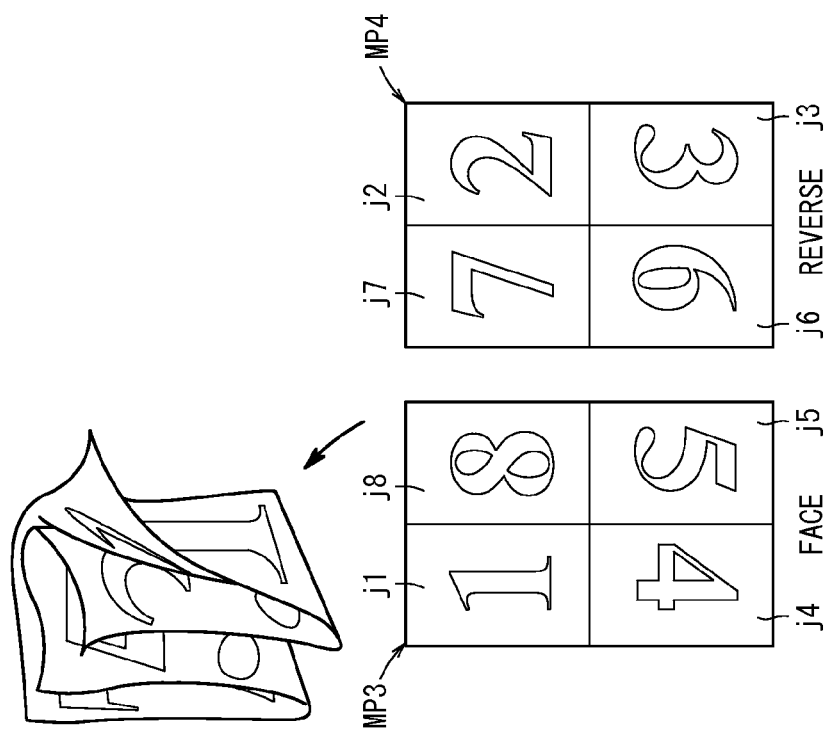
FIG. 6A is a view showing still other main image data generated by the image output system shown in FIG. 1.

FIGS. 6A and 6B show a case where four jobs j1 through j8 are imposed to each of face and reverse sides of a print sheet on the assumption that a bookbinding process will subsequently be performed on the printed sheets. In FIG. 6A, outlined characters 1 through 8 represent the order of pages of the jobs j1 through j8 which are imposed, and the vertical orientation of the outlined characters 1 through 8 represents the vertical orientation of the jobs j1 through j8. If a bookbinding process will subsequently be performed on printed pages, then the interleaf image forming section 46 impose the eight jobs j1 through j8 according to the order of pages shown in FIG. 6A, thereby generating two pieces of main image data MP3, MP4 for the respective face and reverse sides of a print sheet. Based on the main image data MP3, MP4, both-side-printing is performed on the print sheet, thereby producing a print 100, and in the bookbinding process, the print 100 is then folded into a brochure of eight pages (see an upper portion of FIG. 6A).

FIG. 6B shows interleaf image data AP3, AP4 for the main image data MP3, MP4 shown in FIG. 6A. The interleaf image data AP3, AP4 represent an interleaf image a1 generated at the position of the job j1 corresponding to a cover page, i.e., a first page, among the jobs j1 through j8 of the main image data MP3, MP4. In a case where the print 100 is bound together with an interleaf 102 carrying the interleaf image a1 (see FIGS. 9A and 9B), the color of the side edge of the cover page of the interleaf 102 is different from other prints, making it relatively easy to distinguish between adjacent brochures above and below the interleaf 102. The interleaf image forming section 46 determines the job j1 on the cover page of the main image data MP3, and establishes a color/pattern forming area x1 corresponding to the side edge s of the job j1. The interleaf image forming section 46 generates the interleaf image a1 such that the color/pattern forming area x1 is colored in a color different from the color of the side edge of the job j1, and generates the interleaf image data AP3 including the interleaf image a1.

According to the present embodiment, the interleaf image forming section 46 generates the interleaf image data AP1 through AP4 based on the jobs j1 through j8 of the main image data MP1 through MP4. For generating the interleaf image data AP1 through AP4, the interleaf image forming section 46 includes, as shown in FIG. 3, a data reader 56, a subsequent process determiner 58, a job position detector 60, a job state extractor 62, a color/pattern establisher 64, a print information establisher 66, an image generator 68, and an interleaf image integrator 70.

The data reader 56 has a function to read main image data formed by the main image forming section 44 and stored in the storage unit. The data reader 56 refers to a print management file F of the print controller 48 and reads main image data required to generate interleaf image data.

The subsequent process determiner 58 has a function to determine a subsequent process to be performed on prints. In the present embodiment, a bookbinding process performed by the bookbinder 32 and a cutting process performed by the cutter 34 are illustrated as subsequent processes. However, subsequent processes to be performed on prints according to the present invention are not limited to a bookbinding process and a cutting process. The subsequent process determiner 58 may determine a subsequent process in any of various patterns including a command, entered by the user, to select a subsequent process, information received from the printing site 14, etc. For example, if the printing machine 22 is integral with a subsequent processing device, then the subsequent process determiner 58 may receive setting information for a subsequent process from the printing machine 22 and automatically determine the subsequent process from the received information. The subsequent process determiner 58 sends the determination result to the job position detector 60 and the image generator 68.

The job position detector 60 has a function to detect the position of a job of main image data. As described above, an interleaf 102 allows prints 100 to be separated from each other because its side edge which corresponds to the side edge of the job is colored. Therefore, the job position detector 60 detects the position of the side edge of each job as well as the imposed position of each job. The job position detector 60 may detect the position of a job and the position of the side edge of the job, for example, by identifying the position of each job of the main image data read by the data reader 56 and then deriving the position of the side edge of each job from the size of the job. Since a job is usually edited into a rectangular shape, the job position detector 60 identifies the positions of the side edges of all four sides of a job.

The job position detector 60 can limit jobs to be positionally detected, based on the subsequent process determined by the subsequent process determiner 58. For example, if a bookbinding process is subsequently performed on prints, then the job position detector 60 detects only the position of a job to serve as a cover page based on the determined subsequent process. As a result, processing load of the image forming apparatus 18 is reduced. The job position detector 60 sends data of the detected position of the job and the detected position of the side edge of the job to the job state extractor 62.

The job state extractor 62 has a function to extract the color of the side edge of a job based on the positional data of the side edge of the job. If a job is described in a page description language, then since the job includes color information, the job state extractor 62 can easily extract the color of the side edge of the job from the color information of the job. If a job does not have color information of its side edge, then since the side edge is not printed or colored, the job state extractor 62 extracts or scans the color of a print sheet to be printed. As print sheets are usually white in color, the extraction of the color of a white print sheet may be omitted. The job state extractor 62 extracts the color of the side edge of a job from all the four sides. If the four sides are of the same color on the side edge, then the job state extractor 62 may extract the color of the side edge from only one of the four sides. The job state extractor 62 sends the extracted color, i.e., color data, of the side edge to the color/pattern establisher 64.

For generating interleaf image data, the colors of main image data to be printed before and after printing of an interleaf image based on the interleaf image data are extracted. Specifically, the data reader 56 refers to the print management file F of the print controller 48 where the output order of print lots is managed, and reads main image data anterior to and posterior to interleaf image data. Then, the job state extractor 62 extracts the colors of the side edges of jobs of the read two pieces of main image data. The colors of the side edges of the jobs of the two pieces of main image data between which the interleaf image data is interposed (i.e., the two pieces of main image data are located respectively anterior to and posterior to the interleaf image data) are now determined. As a result, an interleaf printed with an image based on the interleaf image data allows stacks of prints anterior to and posterior to the interleaf to be clearly separated from each other.

The color/pattern establisher 64 establishes a color or a pattern for serving as an interleaf, based on the extracted colors of the side edges of the jobs. Specifically, the color/pattern establisher 64 automatically establishes a color different from the extracted colors of the side edges of the jobs, e.g., a color having a color difference $\Delta e$ of 20 or greater in a device-independent space with respect to the extracted colors of the side edges of the jobs. In a case where interleaf image data are thus generated, since the colors of the side edges of the jobs are extracted from the two pieces of main image data, the color/pattern establisher 64 takes into account the extracted two colors and then determines a color suitable for an interleaf. The color/pattern establisher 64 may not necessarily determine one color, but may determine two colors, e.g., yellow and black, and may establish a striped pattern made up of two alternate strips of yellow and black as a pattern for serving as an interleaf.

The interleaf image data may contain print information y described (printed) therein (see FIGS. 9A, 9B, 11A and 11B). The print information y may represent the number of prints, the printer, the printing date, etc. The print information establisher 66 has a function to generate the print information y. More specifically, the print information establisher 66 refers to the print management file F managed by the print controller 48 and automatically acquires printing conditions including the number of prints, etc. Then, the print information establisher 66 chooses among or rearranges the acquired printing conditions to generate print information y to be described in the interleaf image data. The print information establisher 66 sends the generated print information y to the image generator 68.

The image generator 68 establishes a color/pattern forming area corresponding to a job, and embeds color data for a color to be applied to the color/pattern forming area. The image generator 68 embeds color data for a color to be applied to the color/pattern forming area based on the determination result about the subsequent process sent from the subsequent process determiner 58, the positional data of the job and the positional data of the side edge of the job sent from the job position detector 60, and the color data sent from the color/pattern establisher 64, thereby generating an interleaf image.

The interleaf image integrator 70 integrates the interleaf images sent from the image generator 68 into one pieces of interleaf image data. The interleaf image data generated by the interleaf image integrator 70 are stored in the storage unit of the image forming apparatus 18.

The print controller 48 of the image forming apparatus 18 has a function to manage printing conditions of main image data and interleaf image data and send a print command signal to the printing machine 22 in a case where a printing process is carried out. The print controller 48 includes a main image printing condition establisher 72, an interleaf image printing condition establisher 74, a job print run establisher 76, a print lot establisher 78, a print order establisher 80, and a print commander 82.

The main image printing condition establisher 72 stores data of printing conditions representing the number of prints to be produced which is entered or selected by the user, a subsequent process, etc. in the print management file F, and sends the data of printing conditions to the print lot establisher 78.

The interleaf image printing condition establisher 74 stores data of printing conditions representing information as to whether there is an interleaf or not which is entered or selected by the user, details of a subsequent process, etc. in the print management file F, and sends the data of printing conditions to the print order establisher 80.

In a case where the job print run establisher 76 is supplied with the number of prints to be produced for each job from the user, the job print run establisher 76 stores the number of prints to be produced in the print management file F (see FIG. 12A). The data of the number of prints to be produced for each job is referred to by the print run detector 54 of the main image forming section 44.

The print lot establisher 78 associates main image data with the printing conditions sent from the main image printing condition establisher 72, thereby producing the data of a print lot that can be converted into a print command signal to be sent to the printing machine 22.

The print order establisher 80 combines the printing conditions for an interleaf which are sent from the interleaf image printing condition establisher 74 and the print lot data which are sent from the print lot establisher 78 thereby to establish a print order of a plurality of print lots to be successively printed by the printing machine 22. According to the present embodiment, in association with the printing of a main image, a print lot representing the printing of an interleaf is arranged next to a print lot representing the printing of a main image. In this manner, the print order establisher 80 generates a print management file F as shown in FIGS. 8, 12A and 12B.

The print commander 82 has a function to generate a print command signal according to the print lots that are arranged in a print order established by the print order establisher 80. The print commander 82 sends the generated print command signal to the printing machine 22 at a timing such as operation by the user.

The image output system 10 and the image forming apparatus 18 according to the present embodiment are basically constructed as described above. An operation sequence of the image output system 10 and the image forming apparatus 18 will be described below with reference to flowcharts shown in FIGS. 7 and 10.

FIG. 7 is a flowchart of an operation sequence of the image output system 10 for generating interleaf image data in a case where a bookbinding process is subsequently carried out to produce brochures 104 (see FIG. 9B). The image output system 10 generates interleaf image data depending on jobs of main image data. Therefore, the image output system 10 first edits texts, graphics, etc. in the job image former 50 thereby to produce jobs in step S10.

Next, the imposer 52 imposes the edited jobs to generate main image data to which the jobs are imposed in step S11. The generated main image data are stored in the storage unit of the image forming apparatus 18, and the location of the main image data is managed by the print management file F of the print controller 48.

According to the present embodiment, one of the tasks to be achieved is to separate brochures printed with main image data, by use of a brochure printed with interleaf image data. The main image forming section 44 generates two pieces of main image data between which interleaf image data is interposed (i.e., two pieces of main image data anterior to and posterior to the interleaf image data). In a case where brochures 104 are manufactured, both-side printing is usually performed on print sheets, and hence two pieces of main image data are required to print one print sheet. On the other hand, interleaf image data serve as an interleaf as long as the color thereof is different from the color of one (face side) of the sides of the print sheet. Thus, explanation on main image data printed on the other side (reverse side) of the print sheet will be omitted.

In a case where the main image data are generated, the main image printing condition establisher 72 of the print controller 48 establishes printing conditions (the number of prints to be produced, a subsequent process, etc.) for the main image data in step S12. The main image printing condition establisher 72 may establish printing conditions for the main image data based on input or selection by the user.

Next, in step S13, the print lot establisher 78 associates the main image data and the printing conditions with each other, thereby generating a print lot wherein one piece of main image data is associated with the printing conditions. Accordingly, the print lot establisher 78 generates two print lots based on the two pieces of main image data.

Next, the print order establisher 80 establishes a print order for the two pieces of main image data in step S14. A print order for main image data may be an order in which the print lots of the main image data are formed or a descending order of the numbers of prints. The established print order is stored in the form of a database as the print management file F shown in FIG. 8.

After the print order is established, the subsequent process determiner 58 of the interleaf image forming section 46 determines whether a bookbinding process is to be carried out or not (step S15). Specifically, since jobs on which generation of interleaf image data are based are different depending on a subsequent process such as a bookbinding process or a cutting process, the subsequent process is determined before the interleaf image data are generated. If a bookbinding process is to be carried out, then control goes to step S16. If a bookbinding process is not to be carried out, then control goes to step S30 shown in FIG. 10.

If it is determined that the bookbinding process is carried out, the job position detector 60 detects the position of a job for a cover page from each of the two pieces of main image data (step S16). In this case, the two pieces of main image data are read from the storage unit by the data reader 56 which refers to the print management file F, and are temporarily stored in the data reader 56 as data for generating interleaf image data.

In step S17, the job position detector 60 identifies the side edge of the job for each page cover which has been detected in step S16.

Next, in step S18, the job state extractor 62 extracts the color of the side edge of the job for each page cover which has been identified in step S17.

In step S19, the color/pattern establisher 64 establishes a color and pattern for serving as an interleaf, based on each color extracted in step S18.

The print information establisher 66 acquires information from the print management file F and produces print information y to be described in an interleaf image in step S20. Since the print information y to be described in an interleaf image represents information about the main image data anterior to the interleaf image data (i.e., to be printed earlier) among the two pieces of main image data between which the interleaf image data is interposed, the print information establisher 66 acquires printing conditions of the main image data to be printed earlier and generates information thereof.

Next, the image generator 68 establishes a color/pattern forming area and a position where the print information is to be described, and generates an interleaf image on a cover page in step S21. More specifically, the color/pattern forming area and the position where the print information y is to be described are established based on the determination result by the subsequent process determiner 58 and the detection result by the job position detector 60, and thereafter it is instructed to print a color established by the color/pattern establisher 64 in the color/pattern forming area, whereby an interleaf image is generated.

Next, in step S22, the interleaf image integrator 70 generates interleaf image data representing the interleaf image generated in step S21. The generated interleaf image data are temporarily stored in the storage unit of the image forming apparatus 18, and the whereabouts of the interleaf image data are managed by the print management file F of the print controller 48.

Then, the interleaf image printing condition establisher 74 establishes printing conditions for the interleaf image data in step S23.

Then, the print order establisher 80 re-establishes a print order by inserting the print lot of the interleaf image data between the print lots of the two pieces of main image data read by the data reader 56 in step S24. The re-established print order is stored in the print management file F shown in FIG. 8. Before the print order is re-established, the print lot of the main image data to be printed earlier is associated with the printing conditions for the interleaf image data, whereby a print lot of the interleaf image data is generated.

Finally, the print commander 82 generates print command signals according to the print lots that are stored in the print management file F, and successively sends the print command signals to the printing machine 22 in step S25. The printing machine 22 then makes prints according to the order of the print lots sent thereto.

Print stacks 100*a* of the respective print lots are produced in the sheet discharge section 26 of the printing machine 22 with interleaves 102 interposed between the print lots. If a bookbinding process is to be performed as a subsequent process, then, as shown in FIG. 9A, an interleaf 102 with a color printed at a position corresponding to a cover page is output and placed on each of the print stacks 100*a*.

In the subsequent process, print stacks 100*a* with interleaves 102 inserted therein are set in the bookbinder 32, which folds and cuts the print stacks 100*a* with the interleaves 102 inserted therein, and binds prints 100 together with the interleaves 102. In this manner, as shown in FIG. 9B, brochures 106 with the interleaf image data printed thereon are produced between brochures 104 with the main image data printed thereon.

Now, a stack of brochures 104 of main image data is produced with brochures 106 of interleaf image data being inserted therein. The stack of brochures 104 is seen in side elevation, whereby the brochures 104 can be separated from each other based on the positions where the brochures 106 of interleaf image data are inserted.

Figure 10:
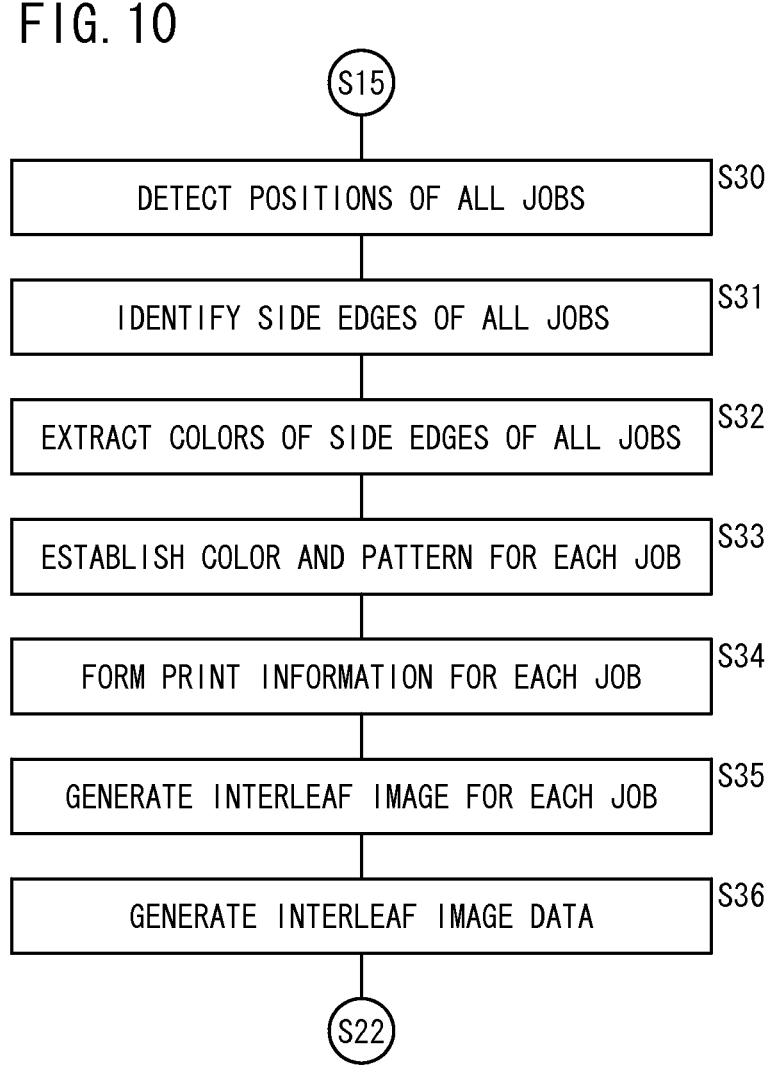
FIG. 10 is a flowchart of an operation sequence of the image output system shown in FIG. 1 for generating interleaf image data in a case where a cutting process is subsequently carried out.

FIG. 10 is a flowchart of an operation sequence of the image output system 10 for generating interleaf image data in a case where a cutting process is subsequently carried out. If the subsequent process determiner 58 of the interleaf image forming section 46 judges in step S15 that a bookbinding process is not carried out, then the subsequent process determiner 58 judges that a cutting process is to be carried out, and control goes to step S30. In the present embodiment, either a bookbinding process or a cutting process is carried out as a subsequent process. However, if another process is carried out as a subsequent process, then the subsequent process is determined.

If a cutting process is carried out as a subsequent process, then an interleaf image is generated depending on all jobs of main image data so that all the jobs divided by the cutting process can be separated by interleaves. Therefore, if it is judged that a cutting process is to be carried out as a subsequent process, then in step S30 the job position detector 60 detects the positions of all jobs of the two pieces of main image data that are read by the data reader 56.

Then, in step S31, the job position detector 60 identifies the side edges of all the jobs detected in step S30.

In step S32, the job state extractor 62 extracts the colors of the side edges of all the jobs identified in step S31.

Then, in step S33, the color/pattern establisher 64 establishes a color and pattern for serving as an interleaf for each job, based on the colors of the anterior and interior jobs extracted in step S32.

Then, the print information establisher 66 acquires information of the print management file F and establishes print information y to be described in an interleaf image for each job in step S34.

Next, the image generator 68 establishes a color/pattern forming area and a position where the print information y is to be described, and generates an interleaf image on a cover page for each job in step S35. More specifically, the color/pattern forming area and the position where the print information y is to be described are established appropriately based on the determination result by the subsequent process determiner 58 and the detection result by the job position detector 60, and thereafter it is instructed to print a color established by the color/pattern establisher 64 in the color/pattern forming area, whereby interleaf images are generated.

Then, in step S36, the interleaf image integrator 70 integrates the interleaf images generated in step S35, into interleaf image data. The generated interleaf image data are temporarily stored in the storage unit of the image forming apparatus 18, and the whereabouts of the interleaf image data are managed by the print management file F of the print controller 48. After step S36, control goes back to step S22. Thereafter, steps S22 through S25 are successively carried out for performing a bookbinding process subsequently.

Therefore, if a cutting process is carried out as a subsequent process, then the printing machine 22 outputs interleaves 102 with a color printed at positions corresponding to all jobs, and places the interleaves 102 on respective print stacks 100*a*, as shown in FIG. 11A.

In the cutting process, the print stacks 100*a* with the interleaves 102 inserted therein are set in the cutter 34, and cut by the cutter 34. Therefore, prints 100 together with the interleaves 102 are cut into print stacks 110*a* for the respective jobs, as shown in FIG. 11B. In this case, between the print stacks 110*a* for the respective jobs, similarly-cut interleaves 112 each having an interleaf image are interposed. As described above, since a color or pattern for serving as the interleaf 112 is printed on the side edge, i.e., the color/pattern forming area x, of the interleaf image, the print stacks 110*a* for the respective jobs can easily be separated based on the positions where the interleaves 112 are inserted, by viewing the print stacks 110*a* from side thereof.

With the image forming apparatus 18, the image forming method, the image output system 10, and the program according to the present embodiment, in a case where images based on main image data according to a plurality of jobs are printed on print sheets, even if a subsequent process is performed on the prints 100, 110, the prints 100, 110 can easily be separated based on printed interleaves 102, 112 on which interleaf images based on interleaf image data corresponding to the jobs are printed. Since the prints 100, 110 can easily be separated, the overall process of producing the prints 100, 110 can be performed with an increased efficiency.

Furthermore, as an image having a color or pattern that is different from those of jobs is formed on the color/pattern forming area x of interleaf image data which correspond to the side edges of the jobs, the color or pattern different from those of the jobs is exposed on the side edge (color/pattern forming area x) of interleaves processed by the subsequent process. The exposed color or pattern makes it easy to separate the prints after they have been processed by the subsequent process.

The image forming apparatus 18, the image forming method, and the image output system 10 according to the present invention are not limited to the above embodiment, but various changes and modifications may be made thereto without departing from the scope of the invention.

For example, though the image output system 10 inserts a print lot for outputting interleaf image data between print lots for outputting two pieces of main image data in the illustrated embodiment, the image output system 10 may insert interleaf image data into a print lot for outputting one piece of main image data. For example, if 500 prints for one print lot is output, and an interleaf is to be inserted for each set of 100 prints, then interleaves may be output while the print lot is being printed, by incorporating information about a timing to output interleaf image data, into the print lot.

In the main image forming section 44, the print run detector 54 may detect the number of prints for jobs and impose the jobs thereby to form main image data. In this case, the job print run establisher 76 is supplied with the number of prints for each job and the size of each job as instructed by the user, and the number of prints for each job is stored in a print management file F (see FIG. 12A). The print run detector 54 refers to the print management file F, assigns data about the number of prints to the jobs, and sends the jobs to the imposer 52. The imposer 52 sorts the jobs each having data about the number of prints, into groups, such that each group has jobs whose numbers of prints are relatively close to each other, i.e., the jobs in each group have the similar numbers of prints. In this case, the print size of the main image data and the size of the jobs are automatically taken into account, and thus appropriate jobs are selected. For example, if the main image data have print size A2, then eight jobs of size A4 whose numbers of prints are relatively close to each other may be imposed together. Alternatively, jobs whose numbers of prints are relatively close to each other may be initially selected, and, of the selected jobs, jobs having different sizes may be automatically imposed as shown in FIG. 5A.

The main image forming section 44 imposes jobs having the similar numbers of prints thereby to generate main image data. Then, the main image forming section 44 sends the main image data and data of the imposed jobs to the print controller 48, and the print lot establisher 78 forms print lots and stores them in a print management file F shown in FIG. 12B. Then, the greatest number of prints of a job among them is established as the number of prints of the main image data. Consequently, since the numbers of prints of the other jobs are necessarily included, any shortage of the numbers of prints of the jobs is avoided.

Furthermore, since interleaf image data can be also generated according to the above forming process with respect to main image data imposed and formed based on the numbers of prints of jobs, it is easy to separate print stacks 110a for each of the jobs with interleaves 112 after a subsequent process. In particular, if the numbers of prints of jobs and the numbers of actually produced prints are described (printed) as print information y of an interleaf image, then the number of unwanted prints can be known from the print information y, and thus the number of unwanted prints can be easily removed.

As described above, the numbers of prints for a plurality of jobs are managed, and jobs whose numbers of prints are close to each other are collected from among the plurality of jobs, thereby to form main image data. In a case where such main image data are printed, it is not necessary to perform wasteful printing for each job, and thus prints can be produced at a reduced cost.

Since main image data are printed based on a job that has the greatest number of prints, all the jobs which make up main image data are reliably printed according to only one-time print instruction, and hence the printing process can be performed efficiently.

Further, if the print information y of interleaf images includes the names, addresses, etc. of recipients of prints 110, then the interleaves may be used as address labels.

Although certain preferred embodiments of the present invention have been shown and described in detail, it should be understood that various changes and modifications may be made therein without departing from the scope of the appended claims.

What is claimed is:
1. An image forming apparatus comprising:
a main image forming section for imposing a plurality of jobs and thereby generating at least one piece of main image data; and
an interleaf image forming section for generating an interleaf image depending on the jobs of the main image data and generating interleaf image data including the interleaf image,
wherein the interleaf image forming section includes a job position detector for detecting position of the jobs of the main image data, and establish a position of the interleaf image on the interleaf image data based on the detected position of the jobs,
the interleaf image forming section comprises;
a data reader for reading two pieces of main image data to be printed before and after printing of an: image based on the interleaf image data, based on a print order in which the main image data and the interleaf image data are printed;
a job state extractor for extracting a color or pattern of the side edges of the jobs of the two pieces of main image data; and
an image generator for generating the interleaf image based on the color or pattern extracted by the job state extractor, and
the image forming apparatus further comprising a color/pattern establishing section for automatically establishing a color of the image formed in an area of the interleaf image data to have a color difference of 20 or greater in a device-independent space, based on the color of the side edges of the jobs extracted by the job state extractor.

2. The image forming apparatus according to claim 1, wherein the interleaf image forming section forms an image representing a color or pattern different from those of the jobs, in an area of the interleaf image data which corresponds to positions of side edges of the jobs of the main image data.

3. The image forming apparatus according to claim 1, further comprising:
a subsequent process determiner for determining a subsequent process for a print which is printed with an image based on the main image data;
wherein the interleaf image forming section generates the interleaf image data based on information about the subsequent process determined by the subsequent process determiner.

4. The image forming apparatus according to claim 3, wherein in a case where the subsequent process determined by the subsequent process determiner includes a process of folding the print, the interleaf image forming section identifies the positions of the jobs produced on a cover page or back cover page of the folded print, and forms an image representing a color or pattern different from those of the identified jobs, in an area of the interleaf image data which corresponds to positions of side edges of the identified jobs.

5. The image forming apparatus according to claim 3, wherein in a case where the subsequent process determined by the subsequent process determiner includes a process of cutting the print, the interleaf image forming section identifies the positions of side edges of the jobs divided by the process of cutting the print, and forms an image representing a color or pattern different from those of the identified jobs, in an area of the interleaf image data which corresponds to positions of side edges of the identified jobs.

6. The image forming apparatus according to claim 1, wherein the interleaf image forming section forms print information including at least the number of prints, in a given area of the interleaf image data at a position corresponding to the jobs of the main image data.

7. The image forming apparatus according to claim 1, wherein the job state extractor extracts the color of the side edge of the jobs from all four sides.

8. The image forming apparatus according to claim 1, further comprising a color/pattern establishing section for automatically establishing a color of the image formed in an area of the interleaf image data to have a color difference of 20 or greater in a device-independent space, based on the color of the side edges of the jobs extracted by the job state extractor.

9. An image forming method comprising:
a first step of, with a computer implemented main image forming section, imposing a plurality of jobs and thereby generating at least one piece of main image data; and
a second step of, with a computer implemented interleaf image forming section, generating an interleaf image depending on the jobs of the main image data and generating interleaf image data including the interleaf image,
wherein, in the second step, position of the jobs of the main image data are detected with a job position detector, and a position of the interleaf image established on the interleaf image data based on the detected position of the jobs,
in the second step, two pieces of main image data to be printed before and after printing of an image based on the interleaf image data are read with a data reader, based on a print order in which the main image data and the interleaf image data are printed;
a color or pattern of the side edges of the jobs of the two pieces of main image data is extracted with a job state extractor; and
the interleaf image based on the color or pattern extracted by the job state extractor is generated with an image generator,
the image forming method further comprising a third step of, with a color/pattern establishing section, automatically establishing a color of the image formed in an area of the interleaf image data to have a color difference of 20 or greater in a device-independent space, based on the color of the side edges of the jobs extracted by the job state extractor.

10. An image output system comprising:
a main image forming section for imposing a plurality of jobs and thereby generating at least one piece of main image data;
an interleaf image forming section for generating an interleaf image depending on the jobs of the main image data and generating interleaf image data including the interleaf image; and
a print controller for managing the number of prints of an image based on the main image data and a print order in which images based on the main image data and the interleaf image data are printed, as print information for use in a case where the images based on the main image data and the interleaf image data are printed on the same type of print mediums,
wherein the interleaf image forming section includes a job position detector for detecting positions of the jobs of the main image data, and establishes a position of the interleaf image on the interleaf image data based on the detected positions of the jobs,
the interleaf image forming section comprises:
a data reader for reading two pieces of main image data to be printed before and after printing of an image based on the interleaf image data based on a print order in which the main image data and the interleaf image data are printed;
a job state extractor for extracting a color or pattern of the side edges of the jobs of the two pieces of main image data; and
an image generator for generating the interleaf image based on the color or pattern extracted by the job state extractor, and
the image output system further comprising a color/pattern establishing section for automatically establishing a color of the image formed in an area of the interleaf image data to have a color difference of 20 or greater in a device-independent space, based on the color of the side edges of the jobs extracted by the job state extractor.

11. The image output system according to claim 10, wherein the print controller automatically establishes a print order for printing a predetermined number of prints of the image based on the main image data and thereafter printing the image based on the interleaf image data.

12. The image output system according to claim 10, wherein the interleaf image forming section forms an image representing a color or pattern different from those of the jobs, in an area of the interleaf image data which corresponds to positions of side edges of the jobs of the main image data.

13. The image output system according to claim 10, further comprising:
a subsequent process determiner for determining a subsequent process for a print which is printed with an image based on the main image data;

wherein the interleaf image forming section generates the interleaf image data based on information about the subsequent process determined by the subsequent process determiner.

14. The image output system according to claim 13, wherein in a case where the subsequent process determined by the subsequent process determiner includes a process of folding the print, the interleaf image forming section identifies the positions of the jobs produced on a cover page or back cover page of the folded print, and forms an image representing a color or pattern different from those of the identified jobs, in an area of the interleaf image data which corresponds to positions of side edges of the identified jobs.

15. The image output system according to claim 13, wherein in a case where the subsequent process determined by the subsequent process determiner includes a process of cutting the print, the interleaf image forming section identifies the positions of side edges of the jobs divided by the process of cutting the print, and forms an image representing a color or pattern different from those of the identified jobs, in an area of the interleaf image data which corresponds to positions of side edges of the identified jobs.

16. The image output system according to claim 10, wherein the print controller manages the number of prints for each of the jobs of the main image data; and
the main image forming section automatically generates the main image data by collecting jobs whose numbers of prints are close to each other from among the jobs.

17. The image output system according to claim 16, wherein the print controller detects a job that has the greatest number of prints among the jobs of the main image data, and establishes the number of prints of the main image data.

18. The image output system according to claim 10, wherein the interleaf image forming section forms print information including at least the number of prints, in a given area of the interleaf image data at a position corresponding to the jobs of the main image data.

19. A non-transitory recording medium storing therein a program for enabling a computer to function as:
a main image forming section for imposing a plurality of jobs and thereby generating at least one piece of main image data; and
an interleaf image forming section for generating an interleaf image depending on the jobs of the main image data and generating interleaf image data including the interleaf image,
wherein the interleaf image forming section includes a job position detector for detecting positions of the jobs of the main image data, and establishes a position of the interleaf image on the interleaf image data based on the detected positions of the jobs,
the interleaf image forming section comprises:
a data reader for reading two pieces of main image data to be printed before and after printing of an image based on the interleaf image data based on a print order in which the main image data and the interleaf image data are printed;
a job state extractor for extracting a color or pattern of the side edges of the jobs of the two pieces of main image data; and
an image generator for generating the interleaf image based on the color or pattern extracted by the job state extractor, and
the program further enable the computer to function as a color/pattern establishing section for automatically establishing a color of the image formed in an area of the interleaf image data to have a color difference of 20 or greater in a device-independent space, based on the color of the side edges of the jobs extracted by the job state extractor.

20. The non-transitory recording medium according to claim 19, wherein the program further enables the computer to function as:
a print controller for managing the number of prints of an image based on the main image data and a print order in which images based on the main image data and the interleaf image data are printed, as print information for use in a case where the images based on the main image data and the interleaf image data are printed on the same type of print mediums.

* * * * *